May 11, 1937.　　　　H. HUEBER　　　　2,079,859
AUTOMOBILE HEATER
Filed April 24, 1930
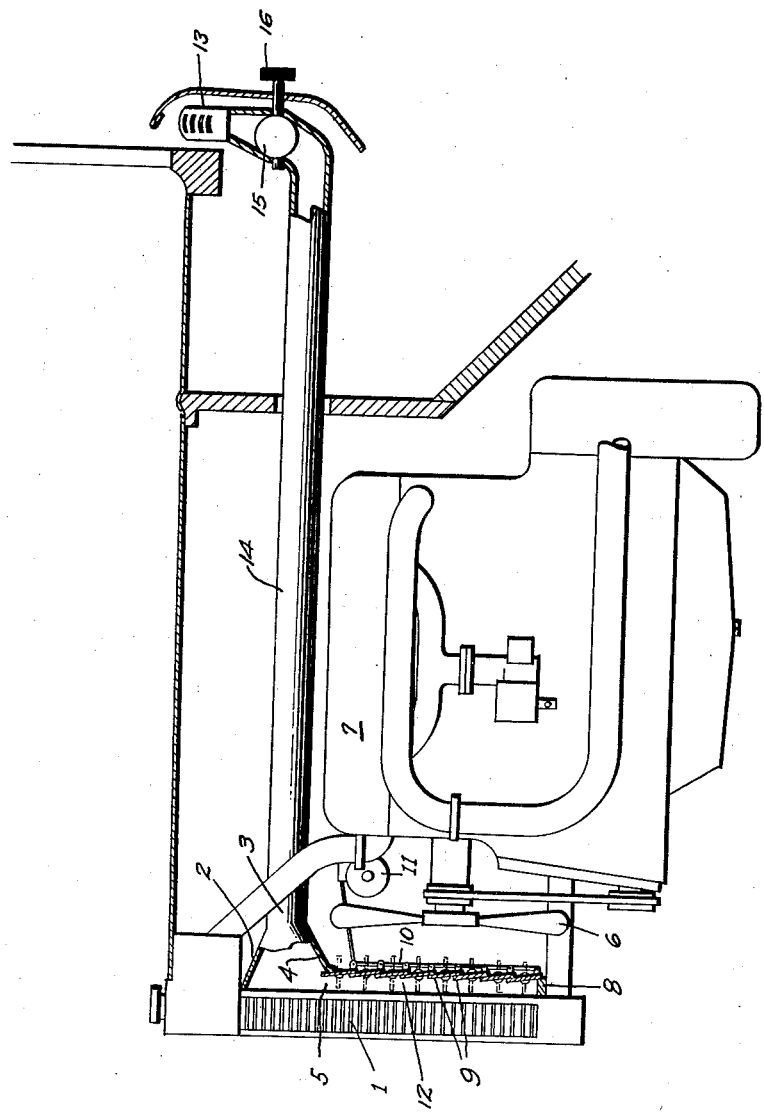
Inventor
Henry Hueber
by Barton A. Beau Jr
Attorney

UNITED STATES PATENT OFFICE

2,079,859
AUTOMOBILE HEATER

Henry Hueber, Buffalo, N. Y., assignor to Trico Products Corporation, Buffalo, N. Y.

Application April 24, 1930, Serial No. 446,927

8 Claims. (Cl. 237—12.3)

This invention relates to automobile heaters which receive their heat supply directly from the air stream of an automobile radiator. In this type of heater the warm air is taken immediately from behind the radiator, and when the radiator is equipped with a shutter this air stream is blocked when the radiator is cold, so that any air which does pass to the heater and on into the vehicle partakes more or less of the engine odors beneath the hood.

The present invention aims to insure a fresh supply of air at all times while at the same time maintaining the shutter equipment for its attendant advantages.

Another object is to control the air stream of the radiator by the heat receiver to insure both an efficient heat supply for the heater and to maintain the liquid in the radiator at efficient working temperature.

The invention will further be found to reside in the salient features of arrangement and construction of the heater, hereinafter more fully set forth, reference being had to the accompanying drawing wherein the figure is a fragmentary longitudinal section through an automobile embodying the present invention.

In the drawing, the numeral 1 designates an automobile radiator, and 2 the heat collector or receiver which is disposed at the rear side thereof and in a position adjacent the upper portion so as to receive the air stream from off that portion of the radiator which is first heated after starting the engine. Thus the efficiency of the heater is materially increased.

In the present embodiment the heat receiver is funnel-shaped or flared so as to collect air from a greater area, said funnel portion converging rearwardly into a throat 3. The lower wall 4 of the funnel is cut away to form an opening 5.

Beneath the funnel and opening 5 is arranged the shutter to the rear of the radiator and between the latter and the fan 6 of the engine 7. This shutter broadly consists of a mounting frame 8 and a plurality of vanes or slats 9 pivotally disposed within the frame for swinging from an operative position (in full lines) to an inoperative position (in dotted lines). The slats may be connected by a link 10 for simultaneous movement and also can be thermostatically controlled as from a thermostat 11. The control and detailed mounting of the shutter may be of an approved style and type and will therefore not be further described or illustrated herein, suffice it to say the shutter is so arranged that when the slats are closed they define a rear wall to a vertical channel or passageway 12 which discharges through the opening 5 into the funnel. Consequently, as the radiator begins to warm, the area from off which the warmed air is taken is enlarged abnormally to amplify the volume of warm air collected by the funnel. The shutter therefore constitutes, when closed, a continuation of the lower wall of the collector 2, and for that reason may be built thereinto.

The connection between the heat receiver 2 and the heat distributor 13 within the car is by means of a conduit 14, a shut-off valve 15 being inserted therein and made accessible to the driver, as by the handle 16. The distributor 13 may be of any desired form.

In operation, upon starting a cold motor, the shutter is retained in the closed position, thereby sealing the radiator from the air stream normally drawn by the fan 6. This condition will cause a rapid rise in the temperature of the radiator fluid, thereby rendering the engine fully efficient in a short time. Such rise in temperature will affect the thermostat 11, which will immediately function to open the shutter. Upon the opening of the shutter, an air stream will be drawn by the fan 6 through the lower portion of the radiator for the cooling thereof, while the warm air to be delivered to the distributor will be collected only from the restricted area at the upper portion of the radiator. Obviously, the said thermostat will by the control of the shutter maintain the radiator liquid at its efficient operating temperature at all periods and it will be apparent that the upper portion or sector of the radiator, being at the top thereof and being closed from the action of the fan by the funnel 2, will at such operating periods have the highest temperature in the radiator, the maximum heat thereof being of course indirectly controlled by the circulation system of the radiator and the thermostat 11.

Upon the movement of the automobile it will be apparent that air will be forced through the radiator due to such movement, and will be heated by the radiator and impelled through the conduit 14 to the distributor 13 and on into the interior of the automobile. Should the services of the heater not be desired the shut-off valve 15 will be closed to block the flow of air through the conduit 14 and consequently the air from the upper part of the radiator will be drawn down into the cooling stream by the fan 6.

What is claimed is:

1. In a combined engine cooling and car heating system comprising, in combination with the radiator and internal combustion engine of the vehicle power plant, a collector disposed immediately adjacent the rear surface of the radiator at the upper portion thereof, a warm air distributor arranged within the automobile, a delivery conduit leading from the collector to the distributor, a control valve for controlling the flow of air to the distributor, a shutter arranged between the engine and the radiator and beneath the collector, said shutter being spaced from the radiator and when closed constituting a wall depending from the collector, and means for opening and closing the shutter, the shutter when closed defining with the radiator a vertical channel opening into the collector and when opened admitting air to the engine for cooling the same.

2. In a combined engine cooling and car heating system comprising, in combination with the radiator and internal combustion engine of the vehicle power plant, a collector disposed immediately adjacent the rear surface of the radiator at the upper portion thereof, a warm air distributor arranged within the automobile, a delivery conduit leading from the collector to the distributor, the underside of the collector having an opening, a shutter arranged beneath the collector and when closed defining with the radiator a channel discharging through the opening into the collector.

3. A combined engine cooling and car heating system for motor vehicles comprising, in combination with the motor vehicle engine and its cooling radiator, a shutter interposed between the engine and the radiator and normally opened to permit air passage from the radiator to the engine, said shutter when closed forming a walled chamber for receiving the warmed air from the radiator, and a warm air distributor disposed within the motor vehicle and connected to said chamber for receiving the warm air from said chamber and distributing the same in the automobile.

4. A combined engine cooling and car heating system for motor vehicles, comprising, in combination with the vehicle internal combustion engine and its radiator, a warm air collector, a warm air distributor for the motor vehicle in communication with the collector, and means interposed between the radiator and the engine normally permitting air flow from the radiator to the engine and operable to interrupt the passage of air from the radiator to the engine and to direct such air to the collector.

5. A combined engine cooling and car heating system for motor vehicles, comprising, in combination with the vehicle internal combustion engine and its radiator, a warm air collector positioned to the rear of the radiator to receive air from off the radiator, a warm air distributor for the motor vehicle in communication with the collector to receive warmed air therefrom, and a normally open shutter constituting a part of the collector and operable to a closed position to direct air from the radiator to the collector and operable to an open position to direct part of the air against the engine.

6. A combined engine cooling and car heating system for motor vehicles, comprising, in combination with the vehicle internal combustion engine and its radiator, a warm air collector positioned to the rear of the radiator to receive air from off the radiator, a warm air distributor for the motor vehicle in communication with the collector to receive warmed air therefrom, a normally open shutter constituting a part of the collector and operable to a closed position to direct air from the radiator to the collector and operable to an open position to direct part of the air against the engine, and means under the control of the temperature of the engine for positioning the shutter to direct the air from the radiator.

7. A combined engine cooling and car heating system for motor vehicles comprising in combination with the internal combustion engine of the motor vehicle and its radiator, a warm air distributing system comprising a collector disposed behind the radiator for receiving warm air from the same, a warm air distributor for the motor vehicle in communication with the collector, a shutter interposed between the engine and radiator and operable when open to direct air from the radiator to the engine and when closed to direct air from the radiator to the collector, and means under the control of the temperature of the engine cooling system for opening and closing the shutter.

8. A combined engine cooling and car heating system comprising, in combination with a radiator and internal combustion engine of the vehicle power plant, a collector disposed immediately adjacent a portion of the rear surface of the radiator, a warm air distributor and a conduit for delivering warm air from the collector to the distributor, a fan disposed at the rear of the radiator for withdrawing air from the portion of the radiator not covered by said collector, and shutter means between the fan and the last mentioned portion of the radiator, said shutter means being spaced from the radiator and when closed defining with the radiator a passage along the rear face of the radiator opening into said collector whereby when the shutter means are closed the air passing through the last mentioned portion of the radiator may pass into the collector.

HENRY HUEBER.